(12) United States Patent
Cohen

(10) Patent No.: US 12,218,499 B2
(45) Date of Patent: Feb. 4, 2025

(54) HYDRAULIC COMPRESSED AIR ENERGY STORAGE SYSTEM

(71) Applicant: STORAGE DROP LTD, Rehovot (IL)

(72) Inventor: Shay Cohen, Kfar Saba (IL)

(73) Assignee: Storage Drop Ltd., Rehovot (IL)

( * ) Notice: Subject to any disclaimer, the term of this patent is extended or adjusted under 35 U.S.C. 154(b) by 0 days.

(21) Appl. No.: 18/009,514

(22) PCT Filed: Jun. 9, 2021

(86) PCT No.: PCT/IL2021/050691
§ 371 (c)(1),
(2) Date: Dec. 9, 2022

(87) PCT Pub. No.: WO2021/250666
PCT Pub. Date: Dec. 16, 2021

(65) Prior Publication Data
US 2023/0216340 A1 Jul. 6, 2023

Related U.S. Application Data

(60) Provisional application No. 63/145,603, filed on Feb. 4, 2021, provisional application No. 63/036,447, filed on Jun. 9, 2020.

(51) Int. Cl.
*H02J 15/00* (2006.01)
*F04F 1/12* (2006.01)
*F17C 1/00* (2006.01)

(52) U.S. Cl.
CPC .............. *H02J 15/006* (2013.01); *F04F 1/12* (2013.01); *F17C 1/007* (2013.01);
(Continued)

(58) Field of Classification Search
CPC ........... F02C 6/16; Y02E 70/30; H02J 15/006
See application file for complete search history.

(56) References Cited

U.S. PATENT DOCUMENTS 9,109,512 B2 * 8/2015 Ingersoll ................... F02C 6/16
2010/0089063 A1 * 4/2010 McBride ................ F15B 21/14
60/682

(Continued)

FOREIGN PATENT DOCUMENTS

CN 102797613 A 11/2012
FR 2975841 A1 11/2012

(Continued)

OTHER PUBLICATIONS

PCT International Search Report and Written Opinion, PCT Application No. PCT/IL2021/050691, Oct. 18, 2021, 17 pages.

*Primary Examiner* — Abiy Teka
(74) *Attorney, Agent, or Firm* — Fenwick & West LLP; Daniel R. Brownstone

(57) ABSTRACT

A hydraulic compressed air energy storage system includes air and liquid tanks, each of which includes interdependent volumes of liquid and air. Each tank includes dedicated passages through which incoming air may be fed, forcing outflow of liquid, or incoming liquid may be fed, forcing outflow of air. Compressed air tanks are connected to a first group of the air and liquid tanks. The system further includes a pump and a liquid turbine, the liquid turbine being electrically connected to a generator for generating electric power. During charging of the system, liquid is pumped through the first group of air and liquid tanks, and air is expelled from the first group of air and liquid tanks and compressed in the compressed air tanks. During discharging of the system, compressed air is released from the compressed air tanks, and said compressed air pumps liquid through the liquid turbine, thereby generating electricity.

16 Claims, 10 Drawing Sheets

(52) U.S. Cl.
CPC .......................... *F17C 2201/0109* (2013.01); *F17C 2201/054* (2013.01); *F17C 2201/056* (2013.01); *F17C 2205/0138* (2013.01); *F17C 2221/013* (2013.01); *F17C 2221/014* (2013.01); *F17C 2221/031* (2013.01); *F17C 2223/036* (2013.01); *F17C 2227/0192* (2013.01); *F17C 2227/0348* (2013.01); *F17C 2250/032* (2013.01); *F17C 2250/043* (2013.01); *F17C 2270/0128* (2013.01); *F17C 2270/0581* (2013.01)

(56) References Cited

U.S. PATENT DOCUMENTS

| | | |
|---|---|---|
| 2012/0097590 A1 | 4/2012 | Early et al. |
| 2014/0261132 A1 | 9/2014 | Zeren et al. |
| 2015/0204484 A1 | 7/2015 | Modirzareh et al. |
| 2019/0276229 A1 | 9/2019 | Elazari-Volcani |
| 2019/0284995 A1* | 9/2019 | Maier .................. H02J 15/003 |

FOREIGN PATENT DOCUMENTS

| | | |
|---|---|---|
| GB | 1603764 A | 11/1981 |
| JP | S62155399 A | 7/1987 |
| WO | WO 02/00003 A2 | 1/2002 |
| WO | WO 2009/154930 A2 | 12/2009 |
| WO | WO 2013/188163 A1 | 2/2013 |

* cited by examiner

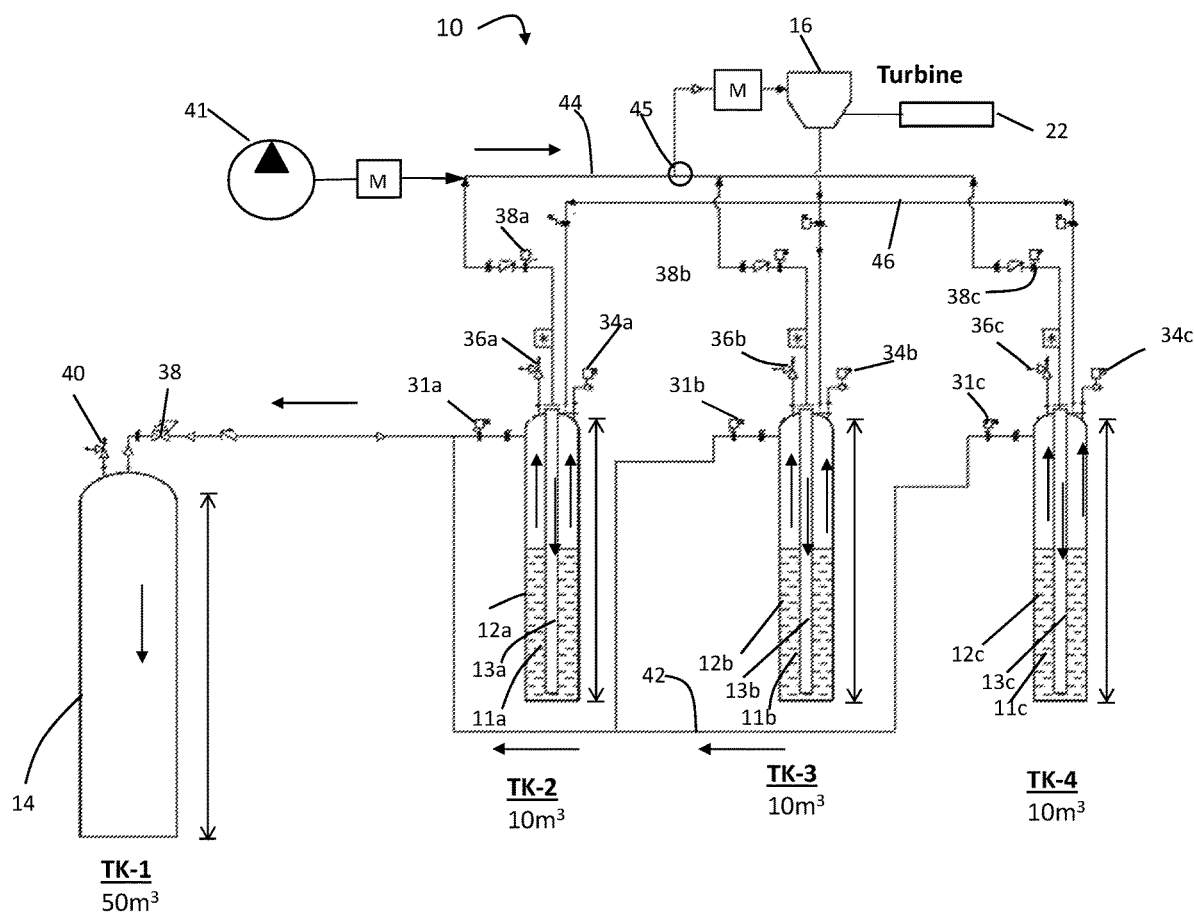

HYDRAULIC COMPRESSED AIR ENERGY STORAGE SYSTEM

RELATED APPLICATIONS

This application claims priority to U.S. Provisional Patent Application 63/036,447, filed Jun. 9, 2020, entitled "A Hydraulic Compressed Air Energy Storage (CAES) System," and to U.S. Provisional Patent Application 63/145,603, filed Feb. 4, 2021, entitled "Combined High-Pressure Receptacle," the contents of which are incorporated by reference as if fully set forth herein.

FIELD OF THE INVENTION

The present disclosure relates to the field of sustainable energy systems, and more specifically, but not exclusively, to a hydraulic compressed air energy storage system capable of storing compressed air or other gases, such as nitrogen or carbon dioxide delivered in tanks connected to the system, at extremely high pressure while controlling the charging and discharging of the system so as to minimize thermal loss of energy.

BACKGROUND OF THE INVENTION

Electricity prices are influenced by a variety of factors that affect the supply and demand equilibrium. Since electricity is mostly produced and consumed simultaneously, demand and supply must be balanced continuously in real-time, causing high volatility and elasticity of electricity prices. Commonly, efforts are invested aiming to adjust the demand for power rather than adjusting the supply, meaning that utility companies actively request industrial and commercial users to tone-down peaks in consumption by temporarily scaling down their machines and other devices' activity. In response, the customer may choose to adjust power demand by postponing some tasks that require large amounts of electric power or may decide to pay a higher price for the electricity. Some customers may choose to alter a part of their energy generation to alternate sources, such as on-site solar panels and batteries. Demand response can be understood merely as a technology-enabled economic rationing system for the electric power market. This voluntary rationing is accomplished by using price incentives; offering lower net unit pricing in exchange for a reduction of power consumption during peak periods. Despite the importance of demand response for the electric power market, producers, distributors and consumers are searching for inexpensive, efficient solutions for quick energy streamlining. The need to even out the graph of energy usage is acute and directly connected to the ability to deliver electricity regularly at reasonable prices.

Energy storage refers to accumulating and storing energy being produced at one time for use at a later time. Commonly, energy storage technologies involve the conversion of energy from a first form that is difficult to store to a second form which is more convenient and/or economical to store. Energy storage enables the accumulation and storage (herein referred to as 'Charging' or 'Charge' step) of energy at low-demand costs (i.e., being consumed from the grid when the demand is low) and the supplying of the stored energy to consumers/grid at peak-demand periods. Storage systems also allow the smoothing out of the high peaks in the output of energy production plants. Energy storage systems are often used in conjunction with renewable electricity production systems to provide uninterrupted supply during power cut hours.

Hydroelectric dams are a common example of energy storage, in which the potential gravitational energy of water is stored at high reservoirs. Other common examples of energy storage are the rechargeable battery (i.e. which stores chemical energy readily converted to electrical energy for operating devices such as a mobile phone), and ice storage tanks (that store frozen ice produced at night while consuming lower rated electricity, and supply cooling during daytime, when the demand for cooling is high and the electrical energy is expensive).

Many energy storage technologies, require specific geographical or topographical conditions, involve enormous engineering and construction costs, consume precious natural resources or lead to accumulated environmental damage (e.g. batteries) or are tailor made for individual applications (e.g., ice storage tanks).

One advantageous technology is Compressed Air Energy Storage (herein referred to as "CAES"), in which ambient air is compressed and stored under pressure (charging cycle) during low demand period. When electricity is required, the pressurized air is heated and expanded in an expansion turbine to drive a generator for power production. CAES offers many advantages with respect to alternative energy storage technologies. Such advantages include lower operational costs, higher safety and environmental characteristics, and improved life time and storage stability as compared to electrical storage means such as batteries. In general, CAES offers unlimited number of charge and discharge cycles, high reliability (i.e., utilizing well known mechanical elements which are being operated and maintained for decades), wide operating temperature range, modularity (i.e., effortless parallel installation of multiple tanks enabling continuous operation during maintenance/failure events), and integration into various usage applications.

Compressed air energy storage solutions may be integrated with water reservoirs. For example, one existing hydraulic CAES solution includes compressing air into an underground air and water reservoir by suitable compressors during low electricity demand periods, thus building a pressure head which pushes water from the underground reservoir up to an aboveground water reservoir. During peak demand periods, the water from the aboveground water reservoir 'falls' back through a turbine into the air and water reservoir, while generating power, which is delivered to the grid. However, the abovementioned existing solution suffers from an intrinsic efficiency limitation, since during its 'charging' step it uses energy consuming air compressors (i.e., being of a low efficiency) for compressing air against the gravitational load of water. Furthermore, the said solutions require specific geographical conditions (i.e., requiring above ground and underground cavities for use as reservoirs, and hence are limited to specific locations.

SUMMARY OF THE INVENTION

Existing solutions have thus not completely met the need for compressed air energy storage, in a manner that maximizes energy storage capacity while being available for implementation in any geographic or topographic conditions.

It is therefore an object of the present disclosure to provide a CAES energy storage system which is suitable to be implemented in any geographic or topographic conditions. It is a further object of the present disclosure to provide a system that is highly energy-efficient during both charging and discharging, and in particular that avoids wastage of energy through heating or cooling of the compressed air. The system is designed to operate at high gas compression pressure, to provide a maximal energy storage density. It is a further object of the present disclosure to implement a CAES system using materials that provide highly efficient charging with low maintenance, thereby providing improved reliability and reducing operational costs. It is yet another object of the present disclosure, to provide a CAES system which is modular and scalable for diverse applications of various sizes.

According to a first aspect, a hydraulic compressed gas energy storage system includes a plurality of gas and liquid tanks, each of which includes interdependent volumes of liquid and gas. Each tank includes dedicated passages through which incoming gas may be fed forcing outflow of liquid, or incoming liquid may be fed, forcing outflow of gas. A plurality of compressed air tanks are communicatively connected to a first group of the gas and liquid tanks. The system further includes a pump and at least one liquid turbine, the liquid turbine being electrically connected to a generator for generating electric power. During charging of the system, liquid is pumped through the first group of gas and liquid tanks and gas is expelled from the first group of gas and liquid tanks and compressed in the plurality of compressed gas tanks. During discharging of the system, compressed gas is released from the compressed gas tanks and said compressed gas pumps liquid through the at least one liquid turbine, thereby generating electricity. Advantageously, the use of gas and liquid tanks to compress the gas provides a high efficiency, low cost form of energy storage. In particular, use of a water piston system lowers mechanical friction losses and leakage losses, and increases heat transfer from the gas to the water.

In another implementation according to the first aspect, each compressed air tank is configured to store compressed air at a pressure of at least 80 bar. This high pressure storage maximizes the energy that may be stored in any given area.

In another implementation according to the first aspect, each compressed air tank has a volume of between approximately 40 liters and 2,000 liters. Advantageously, this range of volumes enables flexible energy storage solutions. In particular, especially when the volume of the tank is at the lower end of this range, the comparatively low volume in each compressed air tank enables maintaining the tanks at extremely high pressure, while maintaining a cost-effective thickness for each tank. In addition, the use of multiple smaller tanks enables exertion of more effective control over the storage and release of the compressed air, while minimizing potential thermal energy losses during expansion or compression of the air.

In another implementation according to the first aspect, each respective compressed air tank includes a pressure sensor configured to measure a pressure in said respective compressed air tank. The system further includes a controller for selectively opening and closing each compressed air tank based on a measured pressure thereof. The controller is used to select which compressed air tank to fill with compressed air, or from which compressed air tank to release compressed air, according to the measured pressure in each tank.

In another implementation according to the first aspect, the system further includes a plurality of nozzles for delivering cold liquid to the first group of air and liquid tanks to thereby cool the air when the air is compressed. Compression of air generally causes the air to heat, thereby causing inefficient energy loss. Cooling the air while compressing it minimizes this energy loss. Thus, compressing the air isothermally helps achieve maximum thermodynamic efficiency.

In another implementation according to the first aspect, the first group of air and liquid tanks comprises a plurality of tanks configured to store compressed air therein at different pressures ranging between atmospheric pressure and a maximum pressure of the compressed air tanks. The series of tanks at different pressures may be used to gradually raise the air pressure, allowing for exertion of greater control over the air compression process as compared to a single stage of compression.

In another implementation according to the first aspect, during discharging of the system, the compressed air pumps liquid through the first group of air and liquid tanks or a second group of air and liquid tanks. The liquid may be circulated through the same air and liquid tanks that were used to compress the air or through a different set of air and liquid tanks.

In another implementation according to the first aspect, during discharging of the system, the compressed air pumps liquid through the second group of air and liquid tanks, and the second group of air and liquid tanks includes a plurality of tanks configured to store compressed air therein at different pressures ranging between atmospheric pressure and a maximum pressure of the compressed air tanks. The series of tanks at different pressures may be used to gradually lower the air pressure, which allows for exertion of greater control over the air compression process as compared to a single stage of compression. The use of multiple liquid and air tanks during the discharging enables full control of the pressure drop level and time of discharge. The system may be operated in a multiple of modes from full storage discharge to partial storage discharge in series, or in a predetermined cycle to achieve best efficiency and moderate variations in the total integrated power output.

In another implementation according to the first aspect, the first group of air and liquid tanks includes at least three air and liquid tanks, wherein, at any point during charging of the system, at least one air and liquid tank is filling with liquid, while at least another gas and liquid tank is emptying of liquid. Advantageously, the use of three or more air and liquid tanks ensures that there is no down-time in the system resulting from switching between one of two air and liquid tanks.

In another implementation according the first aspect, the compressed air tanks are stored within a liquid bath. The liquid bath may further assist in regulating the temperature of the compressed air tanks and thus further prevent inefficient energy loss due to heating.

According to a second aspect, a method of generating electricity with a hydraulic compressed air energy storage system is disclosed. The system includes a plurality of air and liquid tanks, each of which includes interdependent volumes of liquid and air, and dedicated passages through which incoming air may be fed forcing outflow of liquid, or incoming liquid may be fed forcing outflow of air. A plurality of compressed air tanks are communicatively connected to the first group of the air and liquid tanks. The system further includes a pump and at least one liquid turbine, the at least one liquid turbine electrically connected to a generator for generating electric power. The method includes: charging the system by pumping liquid through the first group of air and liquid tanks, to thereby expel air from the first group of air and liquid tanks and compress the air in the plurality of compressed air tanks; and discharging the system by releasing the compressed air from the compressed air tanks and pumping the liquid through the at least one liquid turbine with the compressed air, thereby generating electricity.

In another implementation according to the second aspect, the method further includes, during the charging step, compressing the air to a pressure of at least 80 bar.

In another implementation according to the second aspect, each compressed air tank has a volume of between approximately 40 and 2,000 liters.

In another implementation according to the second aspect, the method further includes measuring a pressure of each compressed air tank with a pressure sensor, and selectively opening and closing each compressed air tank based on a measured pressure thereof.

In another implementation according to the second aspect, the method further includes cooling the air and liquid tanks when compressing the air, so that compression of the air is performed substantially isothermally.

In another implementation according to the second aspect, the method further includes, during the charging step, compressing the air in different stages, each having different maximum pressures.

In another implementation according to the second aspect, the method further includes warming the air and liquid tanks when discharging the air, so that discharge of the air is performed substantially isothermally.

In another implementation according to the second aspect, the method further includes, during the discharging step, pumping liquid with the compressed air through the first group of air and liquid tanks or a second group of air and liquid tanks.

Optionally, the method includes, during the discharging step, decompressing the air in a plurality of stages, each having different minimum pressures.

In another implementation according to the second aspect, the first group of air and liquid tanks include at least three air and liquid tanks, and the method further includes, at all times during the compressing step, filling at least one air and liquid tank with liquid while emptying at least another air and liquid tanks of liquid.

In another implementation according to the second aspect, the method further includes storing the plurality of compressed air tanks within a liquid bath.

According to a third aspect, a system for storing air at high pressure is disclosed. The system includes an array of substantially cylindrical air tanks, each tank configured to store compressed air at a pressure of at least 40 bar; a piping system connecting between an outlet of each respective air tank, the piping system further including at least one central port for delivering compressed air to and from the array; and a storage receptacle surrounding the array and protecting the array from an external environment. Advantageously, using an array of air tanks rather than a single air tank allows for a maximal volume of compressed air to be stored at a comparatively minimal price, while the piping system ensures that compressed air may be selectively delivered to and from each individual air tank. In addition, the thickness of one vessel with high volume at high pressure is significantly higher than the corresponding thickness of small metal tanks, so that the array of tanks is significantly cheaper.

In another implementation according to the third aspect, the system is arranged within a body of water, and the storage receptacle is watertight. Advantageously, storing the system in water may be more cost-effective than storing it on land. Furthermore, compressed air systems typically require low maintenance, thus causing any inconvenience caused by underwater maintenance to be minimal.

Optionally, the system further includes at least one anchoring arm and a plurality of anchoring pillars attached to the at least one anchoring arm, for anchoring the storage receptacle to a floor of the body of water, wherein the at least one anchoring arm passes through the storage receptacle. Anchoring the storage receptacle helps ensure that the storage receptacle will not be damaged due to movements resulting from tides or ocean storms. In addition, passing the arm through the storage receptacle helps distribute the weight of the system along the anchoring arm.

In another implementation according to the third aspect, each cylindrical air tank is oriented with its lengthwise axis parallel to a horizontal access of the storage receptacle. Advantageously, in this orientation, the outlet of each air tank is readily accessible to a technician standing alongside the array. Optionally, the array includes a plurality of cylindrical air tanks stacked in layers. Stacking the air tanks helps maximize the volume of air that may be stored in any given area.

In another implementation according to the third aspect, the system further includes at least one receptacle for storing therein unpressurized air, the at least one receptacle being communicatively connected to the piping system. The at least one receptacle may include one or more large vessels, made significantly larger than the corresponding compressed air tanks. Optionally, the at least one receptacle is stored underwater. Advantageously, underwater storage may be low-cost, with minimal limitations caused by maintenance.

In another implementation according to the third aspect, the system is integrated into the hydraulic compressed air energy system, according to the first aspect. The array of substantially cylindrical air tanks are the compressed air tanks. Advantageously, through integration of the system for storage of high pressure air into the compressed air energy system, advantages of both aspects are realized simultaneously.

BRIEF DESCRIPTION OF THE DRAWINGS

In the Drawings:

FIG. 3A is a schematic diagram showing charging of a compressed air energy storage system having three air and liquid tanks, according to embodiments of the present disclosure;

DETAILED DESCRIPTION OF THE INVENTION

The present disclosure relates to the field of sustainable energy systems, and more specifically, but not exclusively, to a hydraulic compressed air energy storage system capable of storing compressed air at extremely high pressure while controlling the charging and discharging of the system so as to minimize inefficiencies. The system is capable of consuming electrical power, for example, during low-demand periods, to compress air and thereby charge the system. The system is further configured to release the compressed air, for example, during periods of peak energy demand, to thereby pump liquid through a liquid turbine to thereby generate electrical power.

Energy Storage Systems

Figure 1:
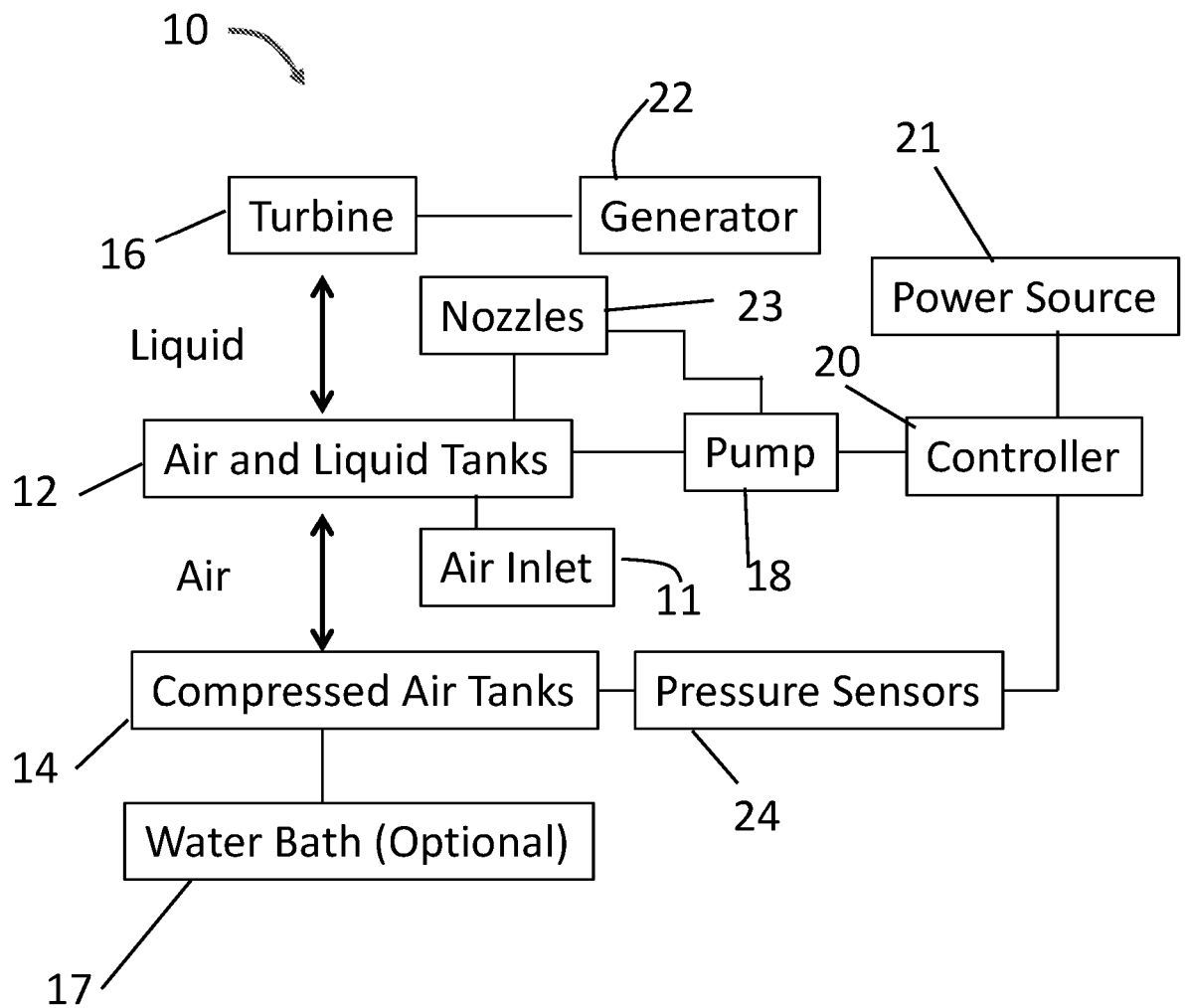
FIG. 1 is a schematic block diagram illustrating different functional components of a hydraulic compressed air energy storage system, according to embodiments of the present disclosure.

Referring now to FIG. 1, system 10 includes two or more air and liquid tanks 12. Air and liquid tanks serve a dual function: housing a liquid piston for compressing air, and receiving compressed air for pumping liquid through a liquid turbine.

Each air and liquid tank may be generally shaped as a cylinder. A central tube may extend from the top of the cylinder to nearly the bottom of the cylinder, thus defining an annulus section between the central tube and the external walls of the cylinder. In exemplary embodiments, the central tube is connected to piping for the inflow and outflow of liquid. The annulus section is connected to piping for the inflow and outflow of air.

Each of the air and liquid tanks 12 is interconnected with the other air and liquid tanks, for example with piping. As a result, liquid and air that are pumped out of one air and liquid tank 12 may enter another air and liquid tank 12.

Air and liquid tanks 12 may be of any suitable materials and dimensions for carrying out the functions described herein. In exemplary embodiments, air and liquid tanks 12 have a volume of approximately 1,000 L. Likewise, the liquid may be any liquid suitable for carrying out the functions describe herein. The air may be atmospheric air, and may alternatively be any suitable gas. For example, the air may be carbon dioxide or nitrogen. In exemplary embodiments, the liquid is water, and the air is conventional atmospheric air.

Each air and liquid tank 12 is connected to an air inlet 11. Air inlet 11 may be a valve that is open to the atmosphere. When the system 10 uses air other than air, or when the system 10 is located in a location without access to atmospheric air (for example, underwater or underground), the air inlet 11 is connected to a suitable source of uncompressed air, for example a large air tank.

At least one pump 18 is included along a fluid path of the air and liquid tanks 12. The pump 18 is used to pump liquid between air and liquid tanks 12 during charging of the system 10. Operation of the pump is controlled by controller 20, and power for the operation of the pump is supplied by power source 21. Power source 21 may be any suitable power source, such as electrical power from a power grid. In exemplary embodiments, power source 21 is an array of solar panels.

Each air and liquid tank 12 may have one or more nozzles 23 associated therewith. The nozzles 23 are used to pump a volume of cooling fluid onto the exterior of air and liquid tanks 12, during compression of the air. In exemplary embodiments, the nozzles are directed at the upper portions of the air and liquid tanks 12, which is the location at which the air is compressed within the air and liquid tanks. This cooling fluid counteracts the natural thermodynamic heating of air during compression thereof. An advantage of cooling the air is that performing the compression and expansion of the air as isothermal processes is more energy-efficient than the equivalent adiabatic processes. Calculations supporting this contention will be provided at the end of the present disclosure. Although operation of the nozzles does require some infusion of energy, the mass flow of water used for cooling is very small compared to the mass of water used for compression. Typically, pump 18 may, in addition to pumping the liquid during compression of the air, also supply the small mass flow needed for cooling the air.

Nozzles 23, or a different set of nozzles, may also be used to pump a volume of warm fluid at the air and liquid tanks 12, during decompression or discharge of the air, so that discharge of the system also proceeds isothermally.

System 10 further includes a plurality of compressed air tanks 14. Compressed air tanks 14 receive compressed air from the air and liquid tanks 12. The pressure in each compressed air tank 14 may be monitored by a pressure sensor 24, which may communicate its pressure readings to a central controller 20. On the basis of these pressure readings, the controller 20 determines which compressed air tank 14 to open to receive therein compressed air or to release therefrom compressed air.

Compressed air tanks are made of any suitable material, such stainless steel. In exemplary embodiments, the compressed air tanks are made of carbon fiber.

In exemplary embodiments, the compressed air tanks 14 are configured to maintain the compressed air at a pressure of at least 40 bar. The pressure may be maintained significantly higher than 40 bar, such as 80 bar, and even as high as up to 400 bar, to thereby increase the energy storage density. In theory, the only upper limit for the pressure of the air is the pressure at which the air liquefies, for a given temperature of the air. One advantage of maintaining this higher pressure is that more energy is stored for the same volume of apparatus. However, storage of the air at higher pressures also poses physical challenges. For example, the container bodies must be sufficiently strong to maintain the compressed air at such pressures. Furthermore, a single container at high pressures may be prone to leaking, which results in inefficiency. In preferred embodiments, to address this concern, rather than using a single compressed air tank with extremely thick walls, system 10 uses multiple compressed air tanks 14. These multiple compressed air tanks 14 each have a comparatively, often significantly, smaller volume than the air and liquid tanks 12. The smaller volume tanks may maintain the same pressures with thinner walls. Moreover, when a smaller volume tank leaks, the resulting loss of compressed air is less than that when a larger volume tank leaks.

In exemplary embodiments, air tanks may be repurposed from other uses for compressed air, for example for medical oxygenation, underwater diving, or workshop burners.

Another challenge raised by maintaining the compressed air at extremely high pressure is that the air heats significantly when compressed and correspondingly cools when expanded. According to Gay-Lusssac's law, when volume is maintained constant, temperature of a gas is directly proportional to pressure of the gas. Thus, increasing a pressure of a gas within a container from 40 bar to 80 bar, for example, has an effect of doubling its temperature. Uncontrolled cooling of air from 80 bar down to atmospheric pressure causes diversion of the stored energy from the turbine, and thus reduced efficiency. Use of multiple small tanks also helps address this challenge. It is easier to control the volume and rate of release of air from many small tanks as compared to from a single large tank.

Yet another advantage of the use of multiple small compressed air tanks 14 is the flow rate of compressed air from the different compressed air tanks 14 may be more easily regulated. This may be desirable in situations in which it is desired to generate a consistent stream of power over a period of time, as opposed to a cumulative amount of power.

An additional advantage of storing the air at as high a pressure as possible is cost savings. Maintaining the compressed air at a higher pressure helps maximize the energy that is capable of being generated, for every unit of area on which the system is implemented. This, in turn, helps manage the cost of the system, and in particular renders the cost of implementation of such a system to be comparable to, or even more favorable than, the cost of alternatives such as batteries.

In exemplary embodiments, there may be as many as hundreds of compressed air tanks 14. These compressed air tanks 14 may be contained in a container, built as a wall, may be connected in one group or several remote groups, and may be installed below or above ground. Compressed air tanks 14 may also be thermally insulated, for example within a water bath. Compressed air tanks 14 may particularly be located at the bottom of a body of water, such as an ocean. Advantageously, the pressure of the water on the outside of the tanks 14 helps equalize the pressure of the compressed air within the tanks 14, thus enabling thinner construction of the tanks 14. Examples of suitable arrangements of compressed air tanks 14 are described below in connection with FIGS. 5A-7.

System 10 further includes at least one turbine 16. Turbine 16 is, in preferred embodiments, a liquid turbine. This is in contrast to conventional compressed air energy systems which use air turbines. During discharging of system 10, compressed air is released from the compressed air tanks 14 through the air and liquid tanks 12. This, in turn, causes flow of liquid from the air and liquid tanks and through the turbine 16. Turbine 16 is operatively connected to generator 22, so that rotational energy of turbine 16 may be converted into electrical energy.

The use of a liquid turbine is particularly advantageous when working with pressures as high as 80 bar, or even higher. When air at pressures of up to 80 bar or higher is depressurized at an air turbine, there is a high likelihood of formation of ice. Formation of ice would stop the operation of the air turbine. One solution for avoiding such ice formation is to warm the air when the air passes through the turbine. However, such warming would be energy-inefficient. Using a liquid turbine instead of an air turbine minimizes this concern. Since the water is incompressible, and has a much higher heat capacity than air and other gases, the water temperature does not decrease below the freezing point. Optionally, the liquid that is delivered through the liquid turbine is heated, which further prevents the formation of ice. The liquid may receive heat from the compressed air or other air during the compression of the air or other air, when it is injected into the compression tanks to ensure isothermal compression. The liquid may alternatively be heated by a liquid nozzle, similar to nozzle 23. The same liquid that is used for cooling during compression of the air may subsequently be heated and used to provide heat during decompression of the air. This nozzle may be operated by a feed line from the high pressure air storage tanks 14, and the energy required to operate the nozzle expends a small amount of energy relative to the energy used to compress the air.

Figure 2:
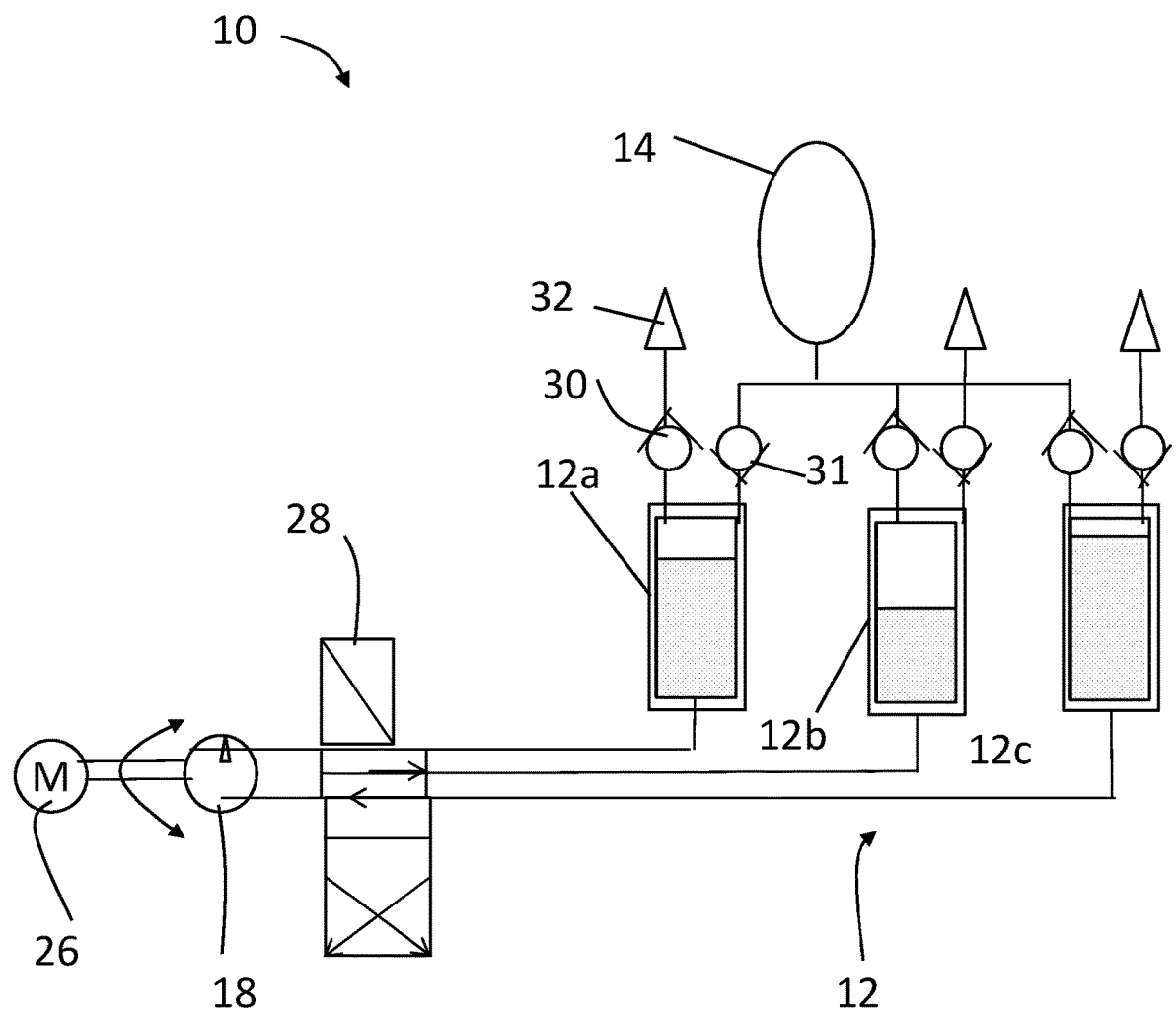
FIG. 2 is a schematic diagram showing operational components of a liquid piston system as part of the compressed air energy storage system of FIG. 1, according to embodiments of the present disclosure.

FIG. 2 is a schematic diagram illustrating the use of the air and liquid tanks as a liquid piston, according to embodiments of the present disclosure. A liquid piston concept is advantageous for improving the efficiency of air compression. Because a liquid can conform to an irregular chamber volume, the liquid may substantially fill an entire air and liquid tank during compression of air, thereby maximizing the surface-area-to-volume ratio. A liquid piston also eliminates air leakage and replaces sliding seal friction (which is present with solid pistons) with viscous friction. The liquid may also be used as a medium to carry heat into and out of the air and liquid tanks 12. When the air is compressed, it generates heat, which is transferred to the liquid. When the air is decompressed, it cools, and this cooling is transferred to the liquid. The use of a liquid piston thus assists in the maintaining of near-isothermal operation.

As illustrated in FIG. 2, motor 26 drives pump 18. Pump 18 drives fluid to and from the liquid pistons according to the configuration of switching valve 28. A conventional liquid piston arrangement includes two air and liquid tanks 12, in which one air and liquid tank 12 is always filling with liquid while another air and liquid tank 12 is always emptying of liquid. In the embodiment illustrated in FIG. 2, there are three air and liquid tanks 12a, 12b, 12c. Tank 12a is filling with liquid to thereby compress air, while one of the tanks 12b or 12c is emptying of liquid and filling with air. In general, when three or more air and liquid tanks 12 are used, the switching valve 28 may be configured such that, at any given time, one air and liquid tank 12 is filling with liquid and at least one of the other tanks 12 is filling with air. This three tanks arrangement enables different compression stages schemes to be implemented easily and with maximal control and efficiency of the compression process.

The air and liquid volumes of tanks 12a, 12b, and 12c are interconnected. This interconnection enables configurable work cycles of system 10, in a similar manner to a multiple piston liquid fuel engine, in which the air and liquid tanks 12 circulate air and liquid between each other.

As any given air and liquid tank 12 is emptied of liquid, the volume of air and liquid tank 12 is filled with air, via an air inlet 32 and non-return valve 30. Following the filling of an air and liquid tank 12 with air, the switching valve 28, is switched to cause liquid to enter the air and liquid tank 12. The incoming liquid compresses the air within the tank 12 up to a predetermined volume. The compressed air is then transferred through non-return valve 31 into compressed air tank 14.

Figure 3B:
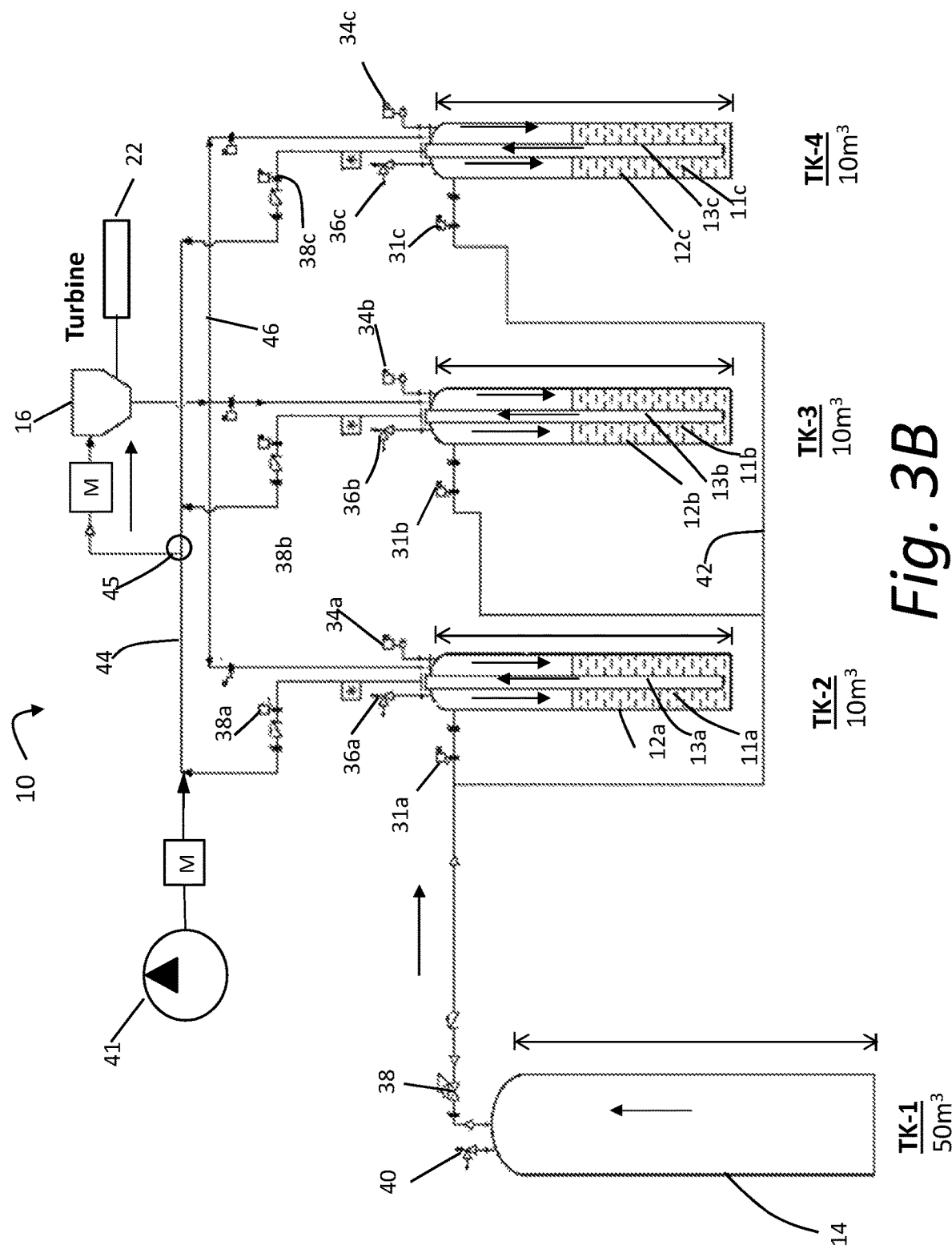
FIG. 3B is a schematic diagram showing discharging of the compressed air energy storage system of FIG. 3A, according to embodiments of the present disclosure.

FIGS. 3A and 3B further illustrate different components of system 10, and in particular the flow of fluid and air during charging and discharging of system 10. System 10 includes three air and liquid tanks 12a, 12b, 12c, each of which stores controllable interdependent volumes of liquid and air. Dedicated air and water passages 42, 44, 46 connect between the air and liquid tanks 12a, 12b, 12c.

During charging of system 10, incoming liquid is fed into air and liquid tanks 12 through passages 44 or 46 to force compression and outflow of air, via passage 42, toward compressed air tank 14. During discharging of system 10, compressed air is fed in the reverse direction, namely from compressed air tank 14, through passage 42 to tanks 12. The compressed air forces outflow of liquid through passage 44 to turbine 16. One or more integrated pumps are connected inline to the passages 44, 46, for pumping liquid into the air and liquid tanks during charging of the proposed system. A generator is connected to the turbine for generating electric power when liquid is forced from the air and liquid tanks 12 towards the turbine during discharging of the system.

In the embodiment of FIGS. 3A and 3B, the same air and liquid tanks are used during both the charging and discharging of the system 10. One advantage of this configuration is that it requires less space for the entire system 10. Another advantage of this configuration is that the liquid may act as a medium for equalizing heat transfer. During the compression of the air, heat is transferred from the air to the liquid. During the decompression of the air, cold is transferred from the air to the liquid. As a result, little heat or cold is lost to the outside environment.

As shown in FIG. 3A, there are three air and liquid tanks 12a, 12b, and 12c. Each air and liquid tank 12a, 12b, 12c includes a central tube 13a, 13b, 13c. Annulus regions 11a, 11b, 11c are defined between the tube and the outer walls of the tank 12a, 12b, 12c. Each annulus region 11a, 11b, 11c is operatively connected to piping 42, which may be galvanized piping. Galvanized piping 42 extends between each air and liquid tank 12a, 12b, 12c and the compressed air tank 14, via a flow control valve 31a, 31b, 31c and pressure regulating valve 38. The compressed air tank 14 also includes pressure safety valve 40. In typical embodiments, there are multiple compressed air tanks 14, each with its own pressure safety valve 40, as discussed above in connection with FIG. 1. Each annulus region 11a, 11b, 11c also includes an air intake pressure safety valve 36a, 36b, 36c, and an additional air outlet safety valve 34a, 34b, 34c. The central tubes 13a, 13b, 13c are operatively connected to turbine 16, via piping 44, which may be, for example, carbone steel piping. The flow path between the central tubes 13 and turbine 16 includes check valves and flow control valves 38a, 38b, 38c. An additional piping network 46 connects fluid from an outlet of the turbine 16 back to the air and liquid tanks 12.

The arrows in FIG. 3A depicts the flow of air and liquid through system 10 when the system 10 is being charged. Charging of the system 10 is also referred to herein as the compression stage. In each air and liquid tank 12, liquid enters the tank 12 via pipe 13, while air enters the annulus portion 11 of the tank 12 from outside the tank 12. The liquid rises within the annulus portion 11 to thereby compress the air that is therein. This compressed air is output through piping 42 to the compressed air tank. The liquid is then recirculated through piping 44, 46 back to the pipe 13, while the annulus portion 11 refills with air. The liquid during the compression stage is pressurized in a pump 41 connected to pipe 44, and a valve 45 to the turbine 16 is closed. Only in the discharge stage is the valve to the turbine opened and water flow through the turbine 16 produces electricity.

Optionally, system 10 further includes one or more liquid tanks (not shown). The liquid tanks are used to store liquid exiting the air and liquid tanks 12 through piping 44. In exemplary embodiments, during the charging stage, the liquid is routed through piping 44, 46 and optionally the storage tank without entering turbine 16, so that it is not necessary to exert energy to rotate the turbine during the charging stage.

The arrows in FIG. 3B depict the flow of air and liquid through system 10 when system 10 is being discharged. Compressed air exits compressed air tank 14 and enters each air and liquid tank 12 through the annulus section 11. The compressed air forces liquid from the tank through tube 11 and up through piping 44, through the liquid tank if present, and through turbine 16. The compressed air remains in the air and liquid tank 12 and expands to fill the entire volume of the air and liquid tank 12. The liquid then recirculates through piping 46, refilling air and liquid tank 12, expelling the expanded air from the annulus 11. An additional round of compressed air is then pumped into the annulus 11, and the cycle is repeated anew, until all the air is restored to atmospheric pressure.

Notably, unlike standard discharge systems, which discharge a store of compressed air in a single burst, often thereby displacing a single, large volume of liquid, the discharge of the compressed air according to the embodiment of FIG. 3B is a cyclical discharge system. This cyclical discharge system uses a small volume of fluid during the entire process. The fluid is circulated between two or more air and liquid tanks 12, using the air expanded from the compressed air tanks 14, or a part of this compressed air.

Optionally, turbine 16 is equipped with a flywheel. The flywheel smooths delivery of power through the turbine, during a change-over between air-and-liquid tanks 12.

The discharge system, according to embodiments of the present disclosure, may be operated in various modes, ranging from full storage discharge (e.g., the entire volume of compressed air, from the maximum pressure to atmospheric pressure) to partial discharge discharged in series. The discharge system may also run in a predetermined cycle optimize to achieve best efficiency and moderate variations in the total integrated power output.

Figure 4:
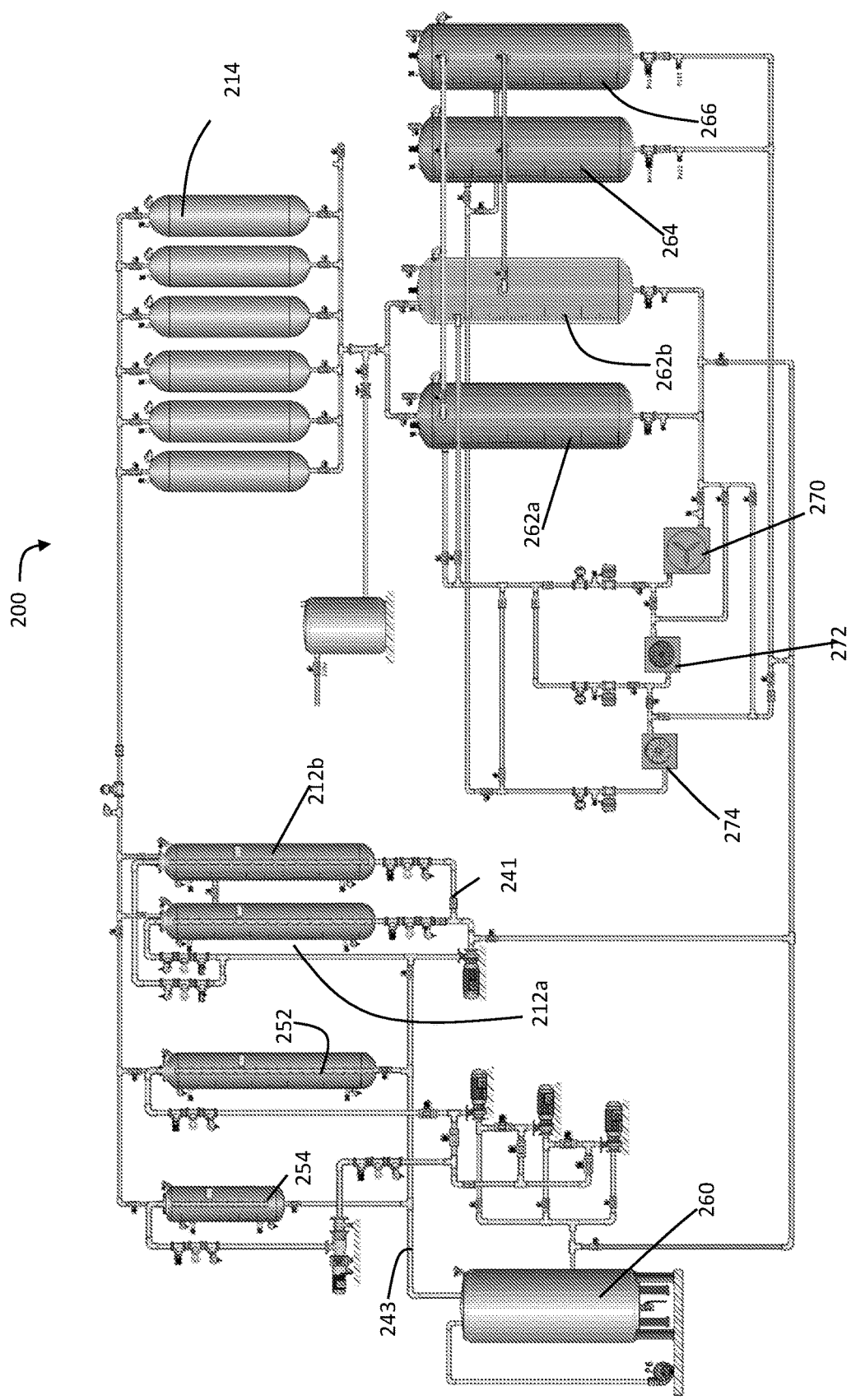
FIG. 4 is a schematic diagram illustrating a second embodiment of a compressed air energy storage system, including a first group of air and liquid tanks for storing compressed air at different pressures during charging of the system, and a second group of air and liquid tanks for storing compressed air at different pressures during discharging of the system, according to embodiments of the present disclosure.

FIG. 4 depicts a second embodiment of a compressed air energy storage system 200. System 200 is similar in most respects to system 10, and accordingly similar reference numerals are used to refer to similar elements, except that the reference numerals begin with "2." System 200 differs from the previous embodiment in that, during charging of the system 200, air is compressed in multiple stages. Similarly, during discharge of system 200, the air is decompressed in multiple stages. By way of example, suppose that the maximum pressure achieved in the compressed air tanks is approximately 80 bar. Reference to 80 bar is merely an example, and, in exemplary embodiments, even higher pressures may be reached. However, increasing air pressure directly from 1 bar to 80 bar, in a single stage, may cause an uncontrollable increase in temperature of the air, thus causing loss of energy to thermal processes. To enable more precise control over the compression and resulting temperature effects, the compression may proceed in stages. For example, tanks 212a and 212b are used as liquid pistons, in the manner set forth above, to compress air from atmospheric pressure to a first pressure level (for example 20 bar). Tanks 212a and 212b share a single volume of liquid which is passed between tanks 212a, 212b via piping 241. This compressed air is introduced into tank 252. While the illustrated embodiment depicts only two tanks 212a, 212b, there may also be a third air and liquid tank at this stage, as disclosed in the previous embodiments. In tank 252, the air is compressed to a second pressure level, (for example 40 bar). This compressed air and liquid is then introduced into tank 254, where the air is compressed again until it reaches a third pressure level (for example 80 bar). The liquid in tanks 252 and 254 is interconnected via piping 243 and tank 260. The volume of tank 254 may be less than the volume of tanks 212a, 212b, and 252, owing to the high pressure at which air is maintained therein. In the illustrated embodiment, tank 254 is approximately a quarter the volume of tank 252 and tanks 212a, 212b. From tank 252, the compressed air is transferred and stored into the compressed air tanks 214.

Similarly, during the discharge of the system 200, the depressurizing of air proceeds in stages. Depressurizing the air from 80 bar to atmospheric pressure in a single stage may result in an undesired loss of energy due to uncontrolled cooling of the air. In order to control the expansion process, during a first stage of discharge, the compressed air drives liquid between air and liquid tanks 262a, 262b and liquid turbine 270. As discussed above, it is also possible for there to be a third air and liquid tank at this stage. Liquid turbine 270 is designed to receive liquid between the pressures of 40 and 80 bar. When the air has expanded sufficiently that its pressure is below, for example, 40 bar, the air continues to be circulated through air and liquid tanks 262a, 262b, but is routed through turbine 272. Turbine 272 is configured to receive liquid at a lower pressure than turbine 270, for example, at 10 to 40 bar. When the air pressure has reached the lower range of turbine 272, the air and liquid are routed from turbine 272 to air and liquid tanks 264 and 266. The air and liquid are exchanged between air and liquid tanks 264, 266 and through a third turbine 274. Turbine 274 is designed to receive liquid at a lower pressure than turbine 272, for example, at pressures of between 3 and 10 bar. Following expansion of the compressed air to the equilibrium pressure through turbine 274, the system is completely discharged.

An advantage of using multiple turbines 270, 272, 274 is that turbines used during discharge of the disclosed hydraulic compressed air energy storage systems are subjected to a very wide head range. For example, the head range may extend from 800 meters at highest pressure to 20 meters at lowest pressure. Since 1 meter of head is equivalent to 0.098 bars, this translates to approximately 80 bar to 2 bar. Rather than attempting to incorporate a turbine that operates efficiently at this vast pressure range, system 200 uses a number of turbines, each operating at only a part of the range.

In an alternative use for the system 200, instead of carrying out all of the compression stages to raise the pressure of the compressed air to 80 bar, a user may stop compressing the air after the first or second stages. As a result, the user may raise the pressure to a pressure that is lower than the maximum that may be achieved with system 200. For example, the pressure may be raised to 40 bar. Such implementations may be desired when there is less time available to charge the system, or when the power needs from the system are sufficiently low that a lower pressure is sufficient to meet them.

In addition or in the alternative to the use of multiple turbines, other mechanisms are possible for controlling the discharging of the compressed air. For example, any of the turbines used in connection with any of the above-described embodiments may employ a counter-pressure mechanism. The counter-pressure mechanism may be a computer controlled variable valve. This counter-pressure mechanism may prevent the turbine from spinning unless the pressure against the turbine exceeds a predefined minimum. The force of the counter-pressure may be controlled as desired, for example gradually decreased, in order to regulate the pace of the decompression of the air. In addition or in the alternative, a blade angle or guide vane angle of the turbine may be adjusted to meet different flow conditions and to keep the efficiency stable, despite any variations in flow rate of liquid through the turbine.

As discussed above in connection with FIG. 1, isothermal compression of the air provides greater energy efficiency than adiabatic compression, with all other factors being the same. The below calculations demonstrate this principle. In the given example, the compressed air is first compressed from standard temperature and pressure conditions into a volume of 50 cubic meters and a pressure of 10 bar. The calculations demonstrate that, although more work is initially required to compress the air under isothermal conditions, the overall efficiency of the system under isothermal conditions, as defined by the percentage of work released during discharge as a percentage of the work introduced during charge, is higher.

Adiabatic Compression

Suppose that air is compressed from atmospheric pressure and temperature into a vessel having a volume of 50 cubic meters, and to a pressure of 10 bar. At the start of the compression, $P_1=1$ bar, and $T_1=300$ K. The mass of the air may be derived according to the following equation:

$$M_1 = \frac{P_1 V}{RT_1} = \frac{10^5 [\text{Pa}] * 50 [\text{m}^3]}{\frac{8314}{29}\left[\frac{\text{J}}{\text{kg} * \text{K}}\right] * 300 \text{ K}} = 58.13 \text{ kg}$$

At the end of the compression, $P_2=10$ bar. In an adiabatic chamber, and assuming the compression is isentropic, the final temperature and mass of the gas are derived according to the following equation:

$$P_1^{1-k} * T_1^k = P_2^{1-k} * T_2^k \rightarrow T_2 = T_1\left(\frac{p_1}{p_2}\right)^{\frac{1-k}{k}}$$

$$T_2 = 300\left(\frac{10}{1}\right)^{\frac{k-1}{k}} = 300 * 10^{\frac{1.4-1}{1.4}} = 578 \text{ K}$$

$$M_2 = \frac{P_2 V}{RT_2} = \frac{10 * 10^5 [\text{Pa}] * 50 [\text{m}^3]}{\frac{8314}{29}\left[\frac{\text{J}}{\text{kg} * \text{K}}\right] * 578 \text{ K}} = 301.7 \text{ kg}$$

The change in energy during this compression is governed by the following equations. As can be seen, the final value for the work is negative, meaning that work is invested.

$$dE = dQ - dW + \sum_i h_i dm_i \rightarrow dU = -dW + h_0 dm_0 h_0 = c_p T_0$$

-continued $$U_2 - U_1 = -W + h_0(m_2 - m_1) m_2 C_v T_2 - m_1 C_v T_1 = -W + C_p T_0 (m_2 - m_1)$$

$$W = C_p T_0 (m_2 - m_1) + C_v (T_1 m_1 - T_2 m_2) = -36{,}494 kj = -10.1 \text{ kwh}$$

Given enough time between charge and discharge of the pressure tank, and depending on the features of the heat transfer of its surroundings, the compressed air in the container cools back to the environmental temperature, and the pressure drops accordingly from 10 bar to 5.17 bar.

$$P_3 = \frac{M_2 R T_3}{V} =$$

$$301[\text{kg}] * 0.2867 \left[ \frac{J}{\text{kg} * K} \right] * 300[K]/50[\text{m}^3] = 517.7[K\,pa] = 5.17[\text{Bar}]$$

In summary, there is now 301 kg of compressed air at a pressure of 5.17 bar at 300 K.

Isothermal Compression

Once again, the initial pressure $P_1=1$ bar and initial temperature $T_1=300$ K. Accordingly, at the start of compression, the mass of the air is 58.13 kg, as before.

$$M_1 = \frac{P_1 V}{R T_1} = 58.13 \text{ kg}$$

At the end of the compression, $P_2=10$ bar, and $T_2=300$ K. As a result, the final mass is calculated as:

$$M_2 = \frac{P_2 V}{R T_{12}} = \frac{10 * 10^5 [\text{Pa}] * 50 [\text{m}^3]}{\frac{8314}{29} \left[\frac{J}{\text{kg}*K}\right] * 300 \text{ K}} = 581 \text{ kg}$$

Notably, this total mass is almost two times the 301 kg mass achieved with adiabatic compression. Furthermore, because the gas is at environmental temperature, there is no need for the gas to cool, and no resulting loss of pressure.

Applying the first law of thermodynamics under a controlled volume:

$$dE = dQ - dW + \sum_i h_i dm_i$$

$$dU = -dW + h_0 dm_0 > -U_2 - U_1 = Q - W + h_0(m_2 - m_1)$$

$$W - Q = m_1 C_v T_1 - m_2 C_v T_2 + C_p T_0 (m_2 - m_1)$$

$$T_2 = T_1 = T_0 > -W - Q = C_v T_0 (m_1 - m_2) + C_p T_0 (m_2 - m_1) = R T_0 (m_2 - m_1)$$

In addition, assuming that the process is reversible and isothermal:

$$dS \geq \frac{dQ}{T} + \sum_i S_i dm_i$$

$$dS = \frac{dQ}{T_0} + S_0 dm_i$$

$$S_2 - S_1 = \frac{Q}{T_0} + S_1(m_2 - m_1) S_0 = S_1 = Const$$

$$m_2 S_2 - m_1 S_1 = \frac{Q}{T_0} + S_1(m_2 - m_1) > -Q = T_0 m_2 (S_2 - S_1)$$

$$Q = T_0 m_2 \left( C_p \ln \frac{T_2}{T_1} - R \ln \frac{P_2}{P_1} \right) > -Q =$$

$$-RT_0 m_2 \ln \frac{P_2}{P_1} = -115{,}064 kj = 31.96 \text{ kwh}$$

$$W = Q + RT_0(m_2 - m_1) = -70{,}080 kj = -19.46 \text{ kwh}$$

Thus, the work invested into the system is 19.46 kWh for obtaining 581 kg compressed air at 10 bar. By contrast, in the adiabatic case, an investment of 10 kWh is applied to get 301 kg compressed air at 10 bar. When considering a difference in the resulting masses from the initial mass of 58 kg, it is evident that, for isothermal compression, less than twice the work is needed to achieve more than twice the increase in mass. This increase in mass of the compressed air is directly proportional to the amount of energy that can be obtained from decompression of the compressed air.

Accordingly, these calculations exemplify the established principle that the minimum work required to compress air is with an isothermal process.

Combined High Pressure Storage Receptacles

Referring now to FIGS. 5A-7, as discussed above in connection with FIG. 1, it is more efficient and cost-effective to store large volumes of high pressure air, or other gases, in multiple small containers as compared to a single large container. Embodiments of arrays of high pressure receptacles are accordingly described below.

High pressure receptacles that may accommodate pressures higher than 40 bar, such as 150 bar or even higher, are hard and costly to produce. The cost of production stems from mechanical and safety constraints that require a material strong enough for the production of the receptacle, as well as high-quality production processes for ensuring a hermetic volume. The cost of the receptacle exponentially grows with the volume of the receptacle. For example, a 50 m³ receptacle adapted for 40 bar pressure may cost $100,000, but a receptacle adapted for 150 bar may cost four times as much as the 40-bar vessel. Generally, the cost of production and deployment of a high-pressure vessel increases linearly according to the nominal pressure, but exponentially based on the volume.

Figure 5A:
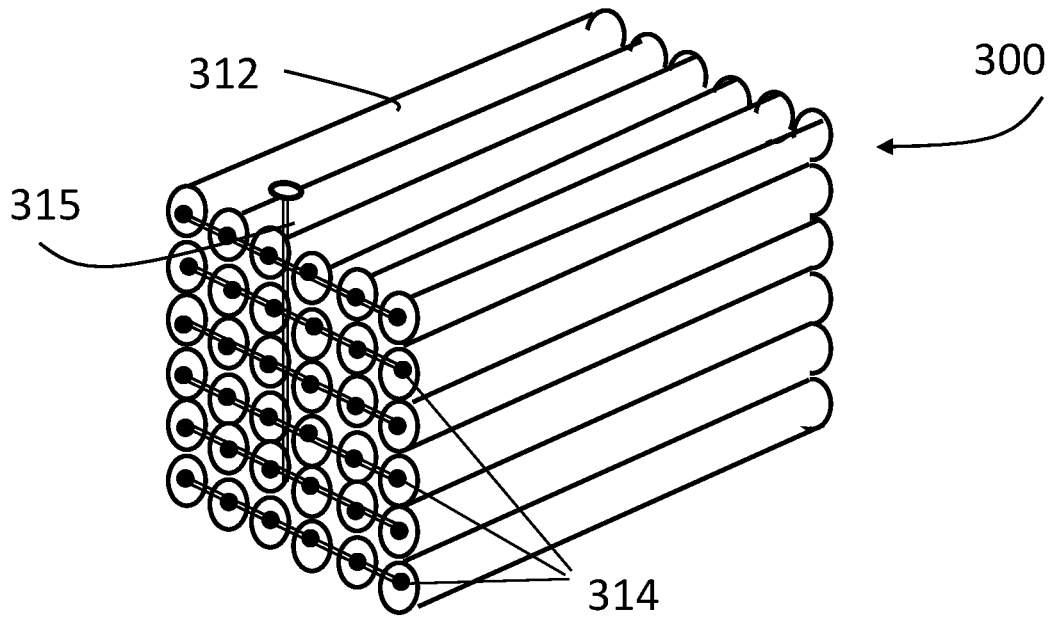
FIG. 5A is a schematic drawing illustrating an array of compressed air storage containers connected by a piping system, according to embodiments of the present disclosure.

Referring now to FIG. 5A, a combined receptacle 300 includes an array of low volume and high pressure cylinders 312. Cylinders 312 may be of a type that are used for storing compressed gases in other industrial contexts, such as assisted breathing, underwater diving, or workshop burners. These conventional cylinders are generally inexpensive; for example, the cost of an industrial high-pressure cylinder, having a gas volume of 40 liter and nominal pressure of 150 bar, is $30-50. A plurality of high pressure cylinders 312 may be stacked together. Each cylinder 312 is connected to a piping system 314 for transferring the compressed air in and out of the combined receptacle 300, and including pressure sensors and valves for regulating the volume of air in each individual cylinder 312. The piping system 314 includes a central port 315 for transferring pressurized air in and out of the combined receptacle 300. For example, the piping system may be connected to a liquid piston arrangement for compressing the air, as described above. Alternatively, the cylinders 312 may be implemented in any system that requires storage of a large quantity of compressed air.

In the illustrated embodiment, the cylinders 312 are arranged in a 6×6 array. The 6×6 array thus forms a combined receptacle with 36 different cylinders 312. In a case in which each receptacle 312 contains 40 liters and holds air at a pressure of 150 bar, the combined receptacle 300 provides, in total, storage of 1440 liters at 150 bar. The expected cost of this combined receptacle 300 is approximately half of that of a single receptacle with the same characteristics. This ratio is expected to grow as the total volume of the combined receptacle 300 increases. In alternative embodiments, the arrays may include, for example twelve or twenty four cylinders 312.

Combined receptacle 300 may be adapted for use deployed on the ground, underground, or underwater. Typically, high-volume, high-pressure containers require only minimal maintenance. Therefore, it is typically cost-effective to store such containers underground or underwater, where the storage space may be less expensive, so long as an adequate approach is left for maintenance. Deployment on ground or underground may require insertion of the combined receptacle in a protective casing, such as a shipping container. Deployment underwater requires insertion of the combined receptacle 300 in a water-tight casing, in order to protect the combined receptacle from undesired exposure to moisture and salinity.

Figure 5B:
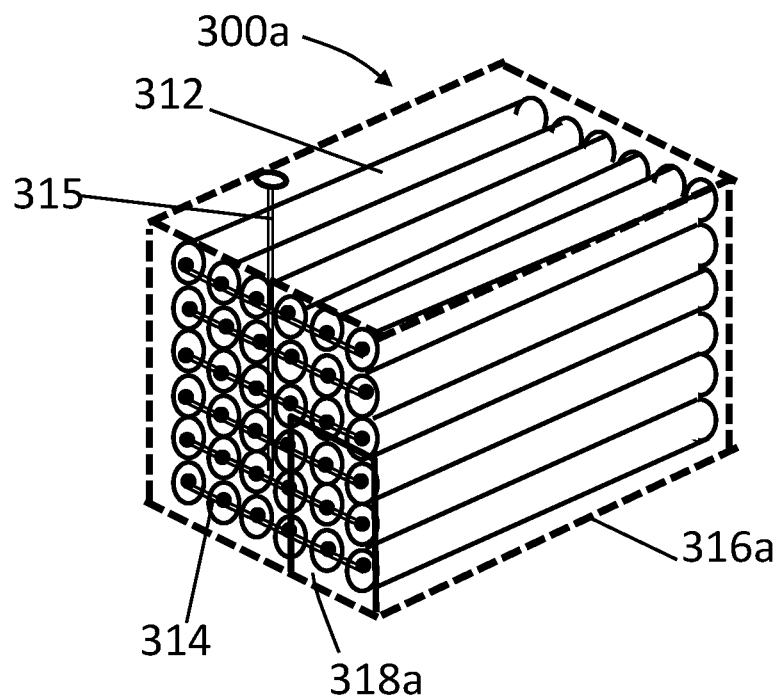
FIG. 5B is a schematic drawing illustrating the compressed air storage containers of FIG. 5A inside an above-ground storage receptacle, according to embodiments of the present disclosure.

FIG. 5B illustrates an exemplary above-ground combined receptacle 300a. The cylinders 312 are stored in a storage receptacle 316a. Receptacle 316a may be made of any material suitable for protecting the cylinders 312 from their environment. For example, receptacle 316 may be a commercial shipping container. Receptacle 316a has a service hatch 318 through which maintenance staff may access the cylinders 312 and piping 314.

Figure 5C:
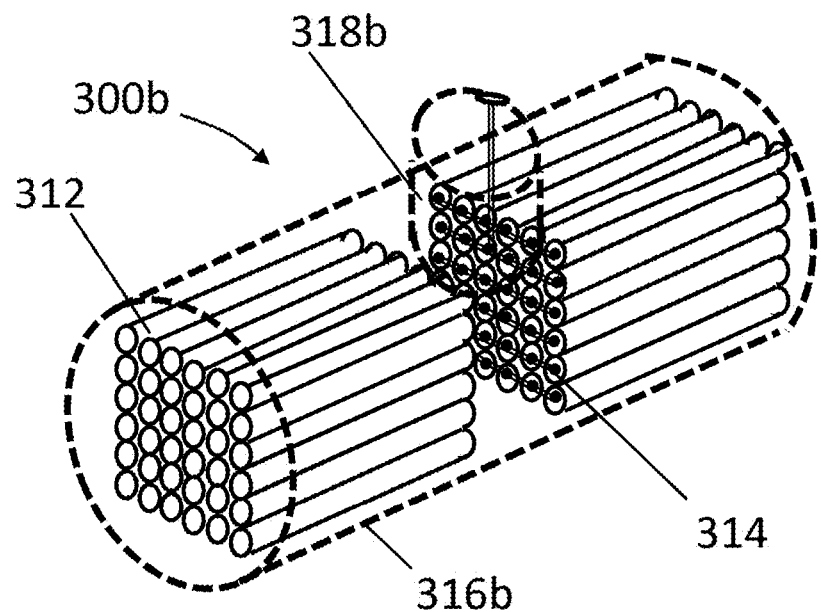
FIG. 5C is a schematic diagram illustrating the compressed air storage containers of FIG. 5A inside an underwater or underground storage receptacle, according to embodiments of the present disclosure.
Figure 5D:
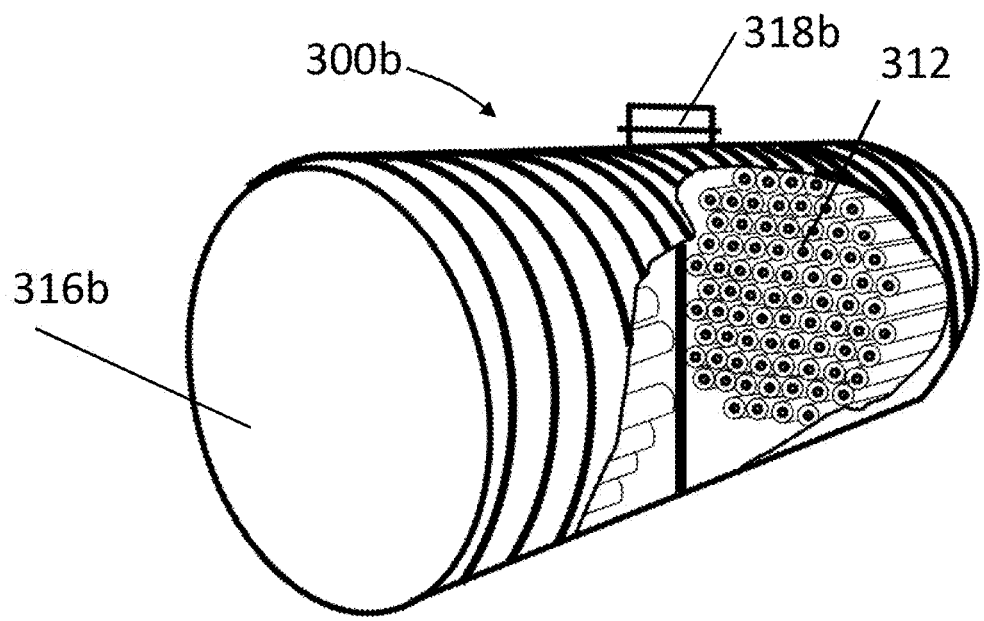
FIG. 5D is an alternative view of the compressed air storage containers of FIG. 5A in an underwater or underground storage receptacle, according to embodiments of the present disclosure.

FIGS. 5C and 5D depict an under-sea deployment system for a combined receptacle 300b. Combined receptacle 300b is stored in a storage receptacle 316b, which may be of plastic material formed as a watertight structure, adapted to protect the combined receptacle 300 from under-sea ambient and weather-related hazards. Receptacle 316b may have a maintenance entry 318 on a top portion thereof. The entry 318 may be positioned in an optimal location for an underground storage tank.

In preferred embodiments, the cylinders 312 are arranged with their longitudinal axes parallel to each other, and parallel to the horizontal axis of the storage container 316a or 316b. In addition, the cylinders may be stacked in a configuration that matches the geometry of the storage receptacle, such as in a rectangular configuration (as in FIG. 5B) or in a substantially cylindrical configuration (as shown in FIG. Advantageously, orienting the cylinders in this way allows for easier filling of the compressed air from the piping system 314 into each cylinder 312, as well as easy access to all of the pipes of the piping system 314 for an individual standing within the storage receptacle 316a or 316b.

Figure 6A:
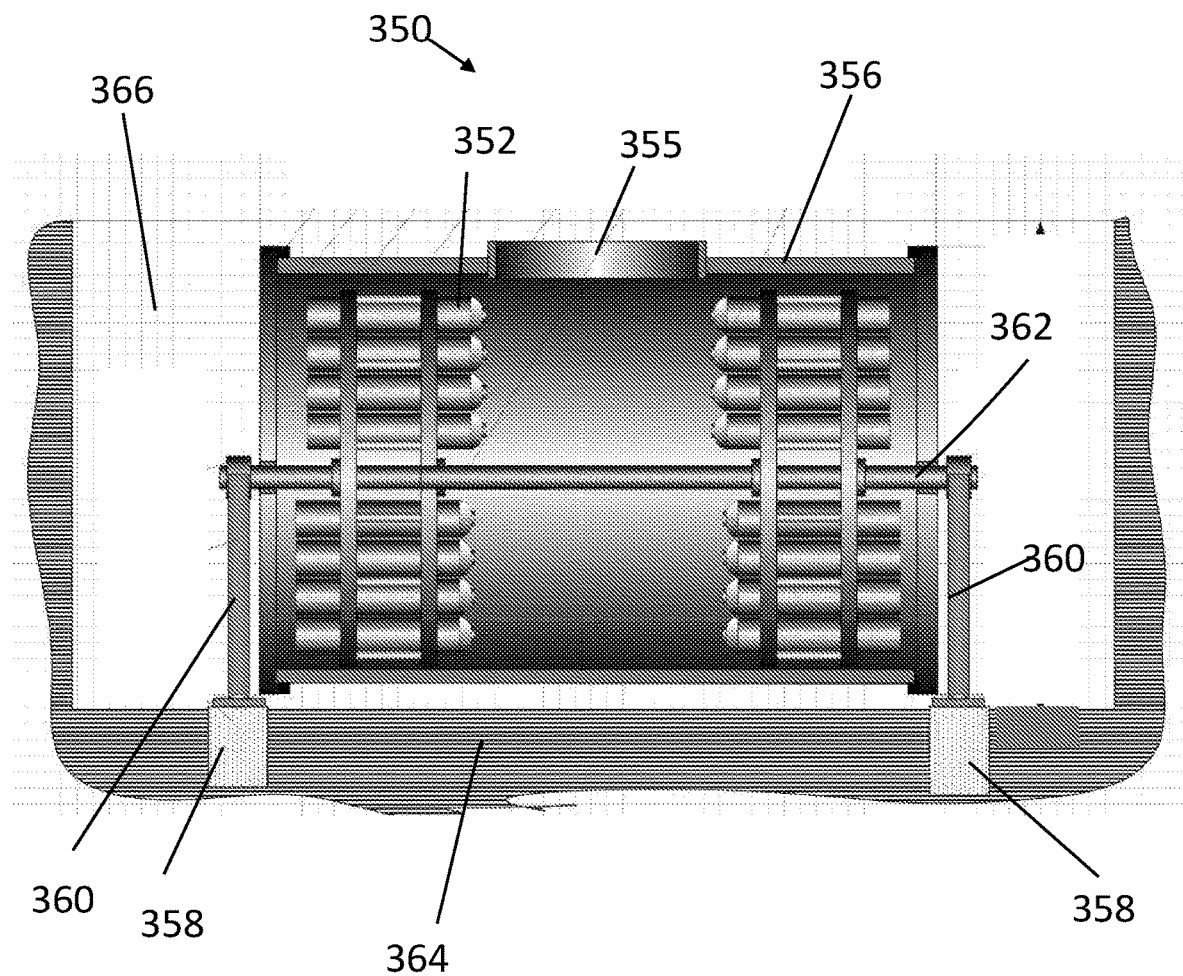
FIG. 6A is a schematic diagram illustrating a first embodiment of an array of compressed air storage containers inside an underwater or underground storage receptacle having anchoring pillars and an anchoring arm, according to embodiments of the present disclosure.
Figure 6B:
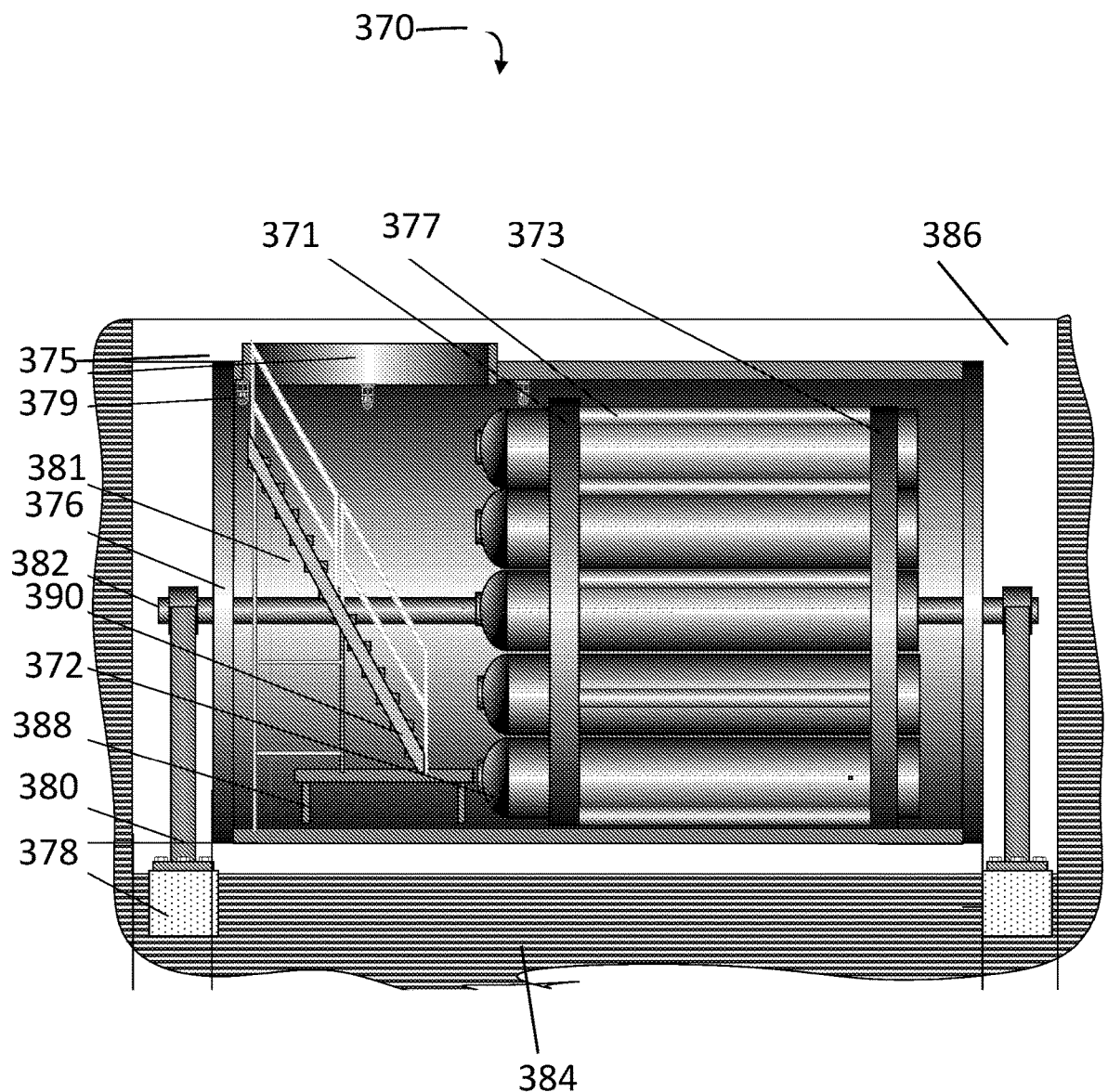
FIG. 6B is a schematic diagram illustrating a second embodiment of an array of compressed air storage containers inside an underwater or underground storage receptacle having anchoring pillars, an anchoring arm, and a maintenance entrance, according to embodiments of the present disclosure.

Referring now to FIGS. 6A and 6B, in certain advantageous embodiments, it is desirable to anchor a receptacle underwater so that the receptacle will remain stationary despite ocean storms and currents. In FIG. 6A, system 350 includes receptacle 356 installed on a surface 364 of a body of water 366. The receptacle 356 includes an entry hatch 355 and arrays of high pressure storage containers 352. The system further includes anchoring pillars comprised of piers 360 and foundations 358 embedded in the surface 364. An anchoring arm 362 extends between the piers 360 and runs along the entire length of receptacle 356. The anchoring arm 362, in conjunction with piers 360 and foundations 358, anchors the array to the surface 364.

FIG. 6B illustrates another embodiment of a receptacle array 370 with an anchoring system. The main difference between the embodiment of FIG. 6B and that of FIG. 6A is that, in the embodiment of array 370, entry hatch 375 is at the side of receptacle 376, rather than in the center of receptacle 376. A staircase 379 and ladder 381 optionally provide access from the hatch 375 to the bottom of receptacle 376. As illustrated in FIG. 6B, an array of cylinders 372 is supported internally by vertical beams 371 and 373, and by horizontal beams 377. In addition, the entire array 370 is anchored to surface 384 of body of water 386 by foundations 378, piers 380, and anchoring arm 382.

Figure 7:
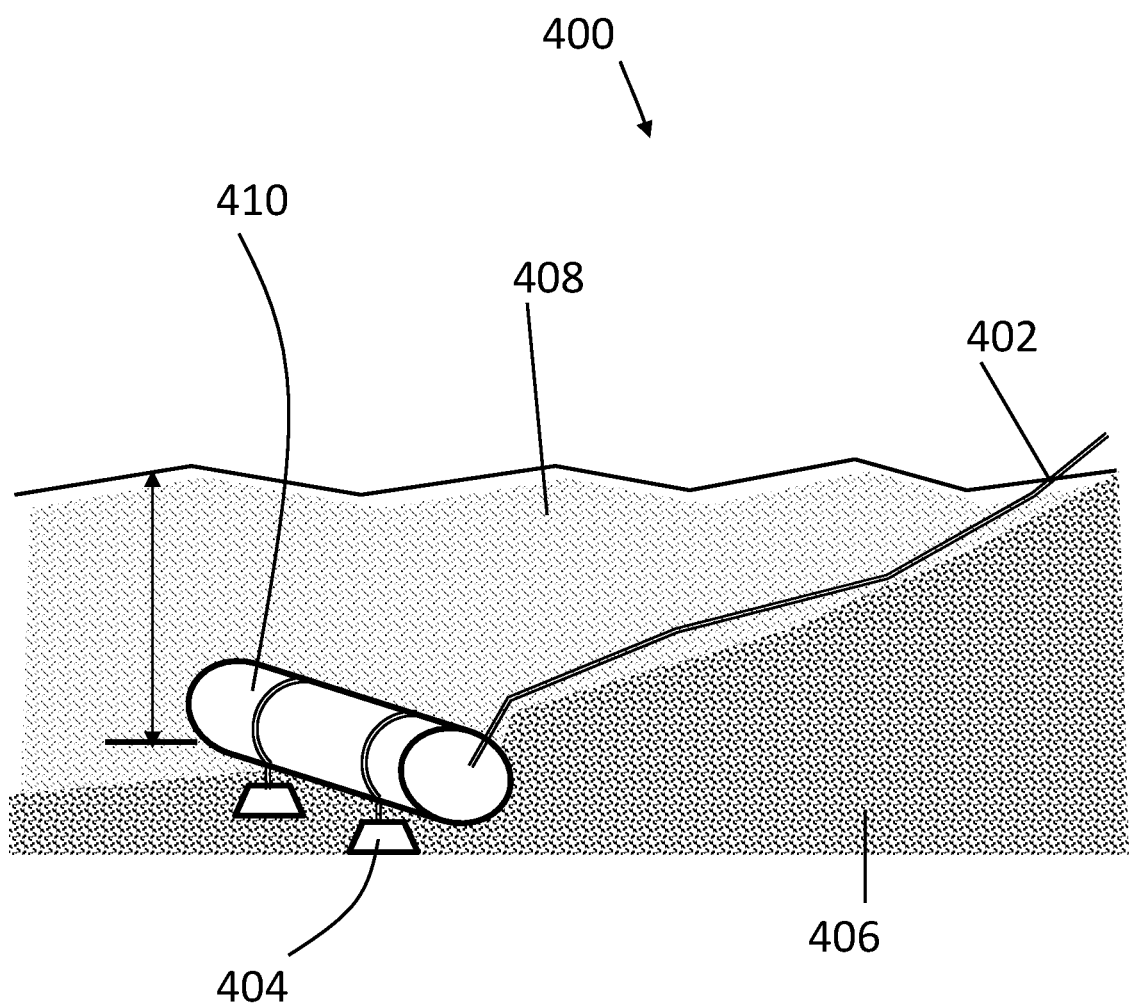
FIG. 7 is a schematic diagram illustrating an underwater storage tank for low pressure air, according to embodiments of the present disclosure.

Referring now to FIG. 7, systems for storage of energy using compressed air are characterized by two different requirements for the storage tanks. On one hand, it is necessary to have an array of high pressure tanks for storing air at pressures of 150 bar and up. This requirement is addressed by the embodiments addressed above. The other requirement relates to the very large storage volumes required for the uncompressed air. In certain embodiments, the uncompressed air may be drawn from ambient atmosphere. However, when the compressed air storage tanks are stored underwater, it may be advantageous to likewise retain a store of uncompressed air underwater, so that the entire system may be run entirely underwater.

FIG. 7 depicts an exemplary low-pressure underwater large volume storage system 400. According to embodiments of the present disclosure, system 400 may contain one or more large tanks 410. The tanks 400 may be made of plastic, rubber, or a similar lightweight material. The tanks 410 may be deployed under sea-level not far away from the shore, at depths of 20-40 meters, thereby taking advantage of the sea water pressure at the installation level, which may be as high as a few bars. Tank 410 may be tied or anchored to by bottom of the sea by heavy objects 404, which may be, for example, concrete blocks or sand bags. One or more pipes 402 may connect tank 410 to an on-shore installation. In alternative embodiments, pipes 402 connect tank 410 to an underwater installation.

Although embodiments of the present disclosure have been described by way of illustration, it will be understood that disclosed embodiments may be carried out with many variations, modifications, and adaptations, without exceeding the scope of the claims.

The invention claimed is:

1. A hydraulic compressed air energy storage system, comprising:
   a plurality of air and liquid tanks, each of which comprises interdependent volumes of liquid and air; and dedicated passages through which incoming air may be fed forcing outflow of liquid, or incoming liquid may be fed, forcing outflow of air;
   a plurality of compressed air tanks communicatively connected to a first group of the air and liquid tanks;
   a pump;
   at least one liquid turbine, the at least one liquid turbine electrically connected to a generator for generating electric power;
   a plurality of nozzles for delivering cold liquid to the first group of air and liquid tanks to thereby cool the air when the air is compressed;
   wherein the first group of air and liquid tanks comprises a plurality of tanks configured to store compressed air therein at different pressures ranging between atmospheric pressure and a maximum pressure of the compressed air tanks;

wherein, during charging of the system, liquid is pumped through the first group of air and liquid tanks in different stages, each having different maximum pressures for the compressed air, and air is expelled from the first group of air and liquid tanks and compressed in the plurality of compressed air tanks, and during discharging of the system, compressed air is released from the compressed air tanks and said compressed air pumps liquid through the at least one liquid turbine, thereby generating electricity.

2. The hydraulic compressed air energy storage system of claim 1, wherein each compressed air tank is configured to store compressed air at a pressure of at least 80 bar.

3. The hydraulic compressed air energy storage system of claim 1, wherein each compressed air tank has a volume of up between 40 and 2,000 liters.

4. The hydraulic compressed air energy storage system of claim 1, wherein each respective compressed air tank comprises a pressure sensor configured to measure a pressure in said respective compressed air tank, and wherein the system further comprises a controller for selectively opening and closing each compressed air tank based on a measured pressure thereof.

5. A method of generating electricity with a hydraulic compressed air energy storage system, wherein the system includes a first group of air and liquid tanks stored within a liquid bath, each of which comprises interdependent volumes of liquid and air, and dedicated passages through which incoming air may be fed forcing outflow of liquid, or incoming liquid may be fed forcing outflow of air, wherein the first group of air and liquid tanks comprises a plurality of tanks configured to store compressed air therein at different pressures ranging between atmospheric pressure and a maximum pressure of the compressed air tanks; a plurality of compressed air tanks communicatively connected to the first group of the air and liquid tanks, a pump, and at least one liquid turbine, the at least one liquid turbine electrically connected to a generator for generating electric power, the method comprising:

charging the system by pumping liquid through the first group of air and liquid tanks in different stages, each having different maximum pressures for the compressed air, to thereby expel air from the first group of air and liquid tanks and compress the air in the plurality of compressed air tanks; and discharging the system by releasing the compressed air from the compressed air tanks and pumping the liquid through the at least one liquid turbine with the compressed air, thereby generating electricity.

6. The method of claim 5, further comprising, during the charging step, compressing the air to a pressure of at least 80 bar.

7. The method of claim 5, wherein each compressed air tank has a volume of between 40 and 2,000 liters.

8. The method of claim 5, further comprising measuring a pressure of each compressed air tank with a pressure sensor, and selectively opening and closing each compressed air tank based on a measured pressure thereof.

9. The method of claim 5, further comprising cooling the air and liquid tanks when compressing the air, so that compression of the air is performed isothermally.

10. The method of claim 5, further comprising warming the air and liquid tanks when discharging the air, so that discharge of the air is performed isothermally.

11. The method of claim 5, wherein the first group of air and liquid tanks comprises at least three air and liquid tanks, and further comprising, at all times during the compressing step, simultaneously filling at least one air and liquid tank with liquid while emptying at least another air and liquid tanks of liquid.

12. A hydraulic compressed air energy storage system, comprising:

a plurality of air and liquid tanks, each of which comprises interdependent volumes of liquid and air; and dedicated passages through which incoming air may be fed forcing outflow of liquid, or incoming liquid may be fed, forcing outflow of air;

a plurality of compressed air tanks communicatively connected to a first group of the air and liquid tanks;

a pump;

at least one liquid turbine, the at least one liquid turbine electrically connected to a generator for generating electric power;

wherein the first group of air and liquid tanks comprises a plurality of tanks configured to store compressed air therein at different pressures ranging between atmospheric pressure and a maximum pressure of the compressed air tanks;

wherein, during charging of the system, liquid is pumped through the first group of air and liquid tanks in different stages, each having different maximum pressures for the compressed air, and air is expelled from the first group of air and liquid tanks and compressed in the plurality of compressed air tanks, and during discharging of the system, compressed air is released from the compressed air tanks and said compressed air pumps liquid through the at least one liquid turbine, thereby generating electricity, wherein the first group of air and liquid tanks comprises at least three air and liquid tanks, wherein, at any point during charging of the system, at least one air and liquid tank is filling with liquid, and at least another air and liquid tank is emptying of liquid.

13. A hydraulic compressed air energy storage system, comprising:

a plurality of air and liquid tanks stored within a liquid bath, each of which comprises interdependent volumes of liquid and air; and dedicated passages through which incoming air may be fed forcing outflow of liquid, or incoming liquid may be fed, forcing outflow of air;

a plurality of compressed air tanks communicatively connected to a first group of the air and liquid tanks;

a pump;

at least one liquid turbine, the at least one liquid turbine electrically connected to a generator for generating electric power;

wherein the first group of air and liquid tanks comprises a plurality of tanks configured to store compressed air therein at different pressures ranging between atmospheric pressure and a maximum pressure of the compressed air tanks;

wherein, during charging of the system, liquid is pumped through the first group of air and liquid tanks in different stages, each having different maximum pressures for the compressed air, and air is expelled from the first group of air and liquid tanks and compressed in the plurality of compressed air tanks, and during discharging of the system, compressed air is released from the compressed air tanks and said compressed air pumps liquid through the at least one liquid turbine, thereby generating electricity.

14. A method of generating electricity with a hydraulic compressed air energy storage system, wherein the system includes a first group of air and liquid tanks, each of which comprises interdependent volumes of liquid and air, and dedicated passages through which incoming air may be fed forcing outflow of liquid, or incoming liquid may be fed forcing outflow of air, wherein the first group of air and liquid tanks comprises a plurality of tanks configured to store compressed air therein at different pressures ranging between atmospheric pressure and a maximum pressure of the compressed air tanks; a plurality of compressed air tanks communicatively connected to the first group of the air and liquid tanks, a pump, and at least one liquid turbine, the at least one liquid turbine electrically connected to a generator for generating electric power, the method comprising:

charging the system by pumping liquid through the first group of air and liquid tanks in different stages, each having different maximum pressures for the compressed air, to thereby expel air from the first group of air and liquid tanks and compress the air in the plurality of compressed air tanks; and discharging the system by releasing the compressed air from the compressed air tanks and pumping the liquid through the at least one liquid turbine with the compressed air and pumping liquid with the compressed air through the first group of air and liquid tanks or a second group of air and liquid tanks, thereby generating electricity.

15. A method of generating electricity with a hydraulic compressed air energy storage system, wherein the system includes a first group of air and liquid tanks, each of which comprises interdependent volumes of liquid and air, and dedicated passages through which incoming air may be fed forcing outflow of liquid, or incoming liquid may be fed forcing outflow of air, wherein the first group of air and liquid tanks comprises a plurality of tanks configured to store compressed air therein at different pressures ranging between atmospheric pressure and a maximum pressure of the compressed air tanks; a plurality of compressed air tanks communicatively connected to the first group of the air and liquid tanks, a pump, and at least one liquid turbine, the at least one liquid turbine electrically connected to a generator for generating electric power, the method comprising:

charging the system by pumping liquid through the first group of air and liquid tanks in different stages, each having different maximum pressures for the compressed air, to thereby expel air from the first group of air and liquid tanks and compress the air in the plurality of compressed air tanks; and discharging the system by releasing the compressed air from the compressed air tanks and pumping the liquid through the at least one liquid turbine with the compressed air and decompressing the air in a plurality of stages, each having different minimum pressures, thereby generating electricity.

16. A hydraulic compressed air energy storage system, comprising:

a plurality of air and liquid tanks, each of which comprises interdependent volumes of liquid and air; and dedicated passages through which incoming air may be fed forcing outflow of liquid, or incoming liquid may be fed, forcing outflow of air;

a plurality of compressed air tanks communicatively connected to a first group of the air and liquid tanks;

a pump;

at least one liquid turbine, the at least one liquid turbine electrically connected to a generator for generating electric power;

wherein the first group of air and liquid tanks comprises a plurality of tanks configured to store compressed air therein at different pressures ranging between atmospheric pressure and a maximum pressure of the compressed air tanks;

wherein, during charging of the system, liquid is pumped through the first group of air and liquid tanks in different stages, each having different maximum pressures for the compressed air, and air is expelled from the first group of air and liquid tanks and compressed in the plurality of compressed air tanks, and during discharging of the system, compressed air is released from the compressed air tanks and said compressed air pumps liquid through the at least one liquid turbine, thereby generating electricity, wherein, during discharging of the system, the compressed air pumps liquid through the first and the second groups of air and liquid tanks or a second group of air and liquid tanks and wherein the second group of air and liquid tanks comprises a plurality of tanks configured to store compressed air therein at different pressures ranging between atmospheric pressure and a maximum pressure of the compressed air tanks.

* * * * *